United States Patent [19]

Neumann

[11] 4,423,476
[45] Dec. 27, 1983

[54] D.C. BLOCKING OSCILLATOR CHARGING DEVICE FOR ELECTRIC VEHICLES

[75] Inventor: Erhard Neumann, Rudersberg-Schlechtbach, Fed. Rep. of Germany

[73] Assignee: Deutsche Automobilgesellschaft mbH, Fed. Republic of Germany

[21] Appl. No.: 243,197

[22] Filed: Mar. 12, 1981

[30] Foreign Application Priority Data

Mar. 12, 1980 [DE] Fed. Rep. of Germany ....... 3009359

[51] Int. Cl.³ .......................................... H02M 3/335
[52] U.S. Cl. ........................................ 363/20; 320/59; 363/71
[58] Field of Search ...................... 363/20, 21, 24–26, 363/56, 71; 320/9, 59, DIG. 1

[56] References Cited

U.S. PATENT DOCUMENTS

| | | | |
|---|---|---|---|
| 3,621,363 | 11/1971 | Ginnman | 363/20 |
| 3,697,852 | 10/1972 | Gerbitz | 363/21 |
| 4,195,333 | 3/1980 | Hedel | 363/21 |
| 4,276,588 | 6/1981 | McLyman | 363/24 |
| 4,313,155 | 1/1982 | Bock et al. | 363/71 |

FOREIGN PATENT DOCUMENTS 52-36717 3/1977 Japan .................................... 363/56

Primary Examiner—William H. Beha, Jr.
Attorney, Agent, or Firm—Craig & Burns

[57] ABSTRACT

A charging device for traction batteries of an electric vehicle consists of a converter module with at least two d.c. blocking converters, each including a control power transistor, a cutoff relief circuit, and a power transformer. The secondary winding of the transformer is connected in series with a rectifier diode and a smoothing capacitor is connected in parallel to the series circuit. The parallel-connected secondary sides of the two blocking converters are connected in such a way that the one secondary winding on the one hand is connected to the negative output terminal and on the other hand by way of one rectifier diode to the positive output terminal. Another secondary winding is connected to the one hand to the positive output terminal and, on the other hand, by way of another rectifier diode to the negative output terminal. A relief circuit composed of diodes is provided on the secondary side of the transformer. All diodes on the secondary side are pulled in such a way that they are current-conductive away from one secondary winding and/or toward the other secondary winding. A smoothing capacitor common to all is provided between the output terminals.

12 Claims, 5 Drawing Figures

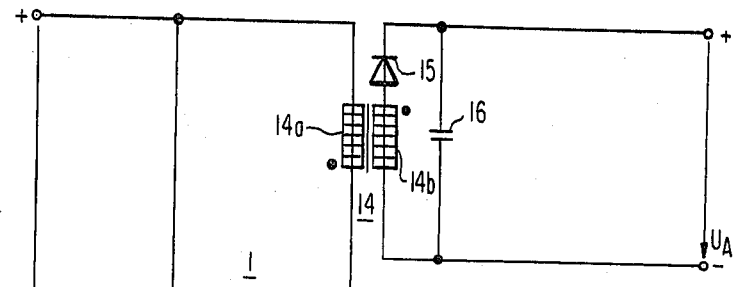
FIG. 1
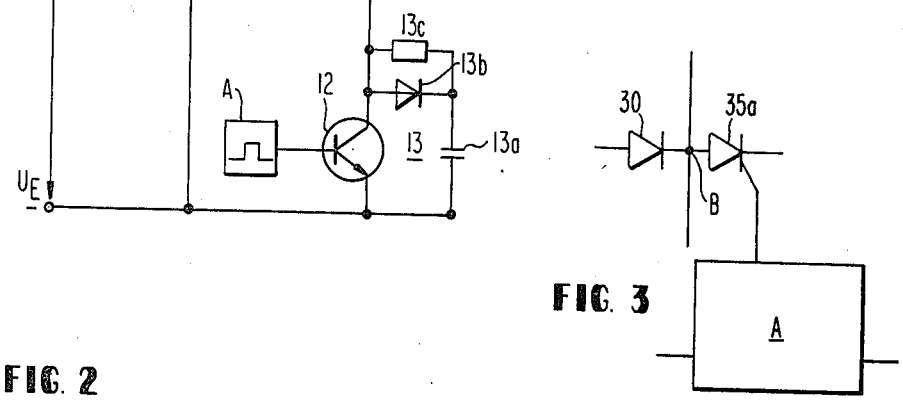
FIG. 3
FIG. 2
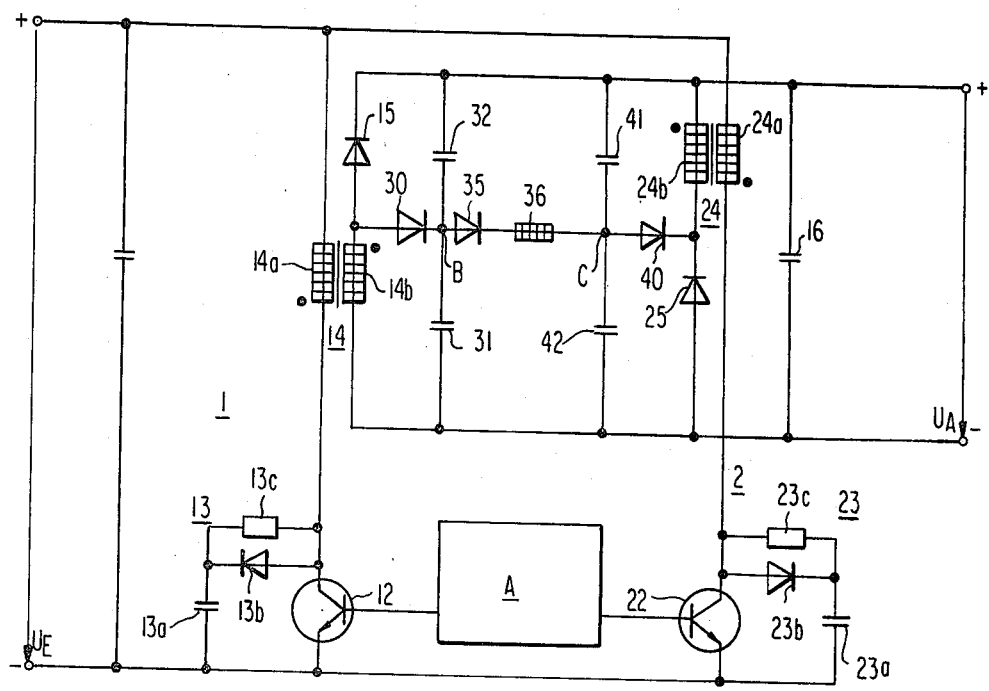

D.C. BLOCKING OSCILLATOR CHARGING DEVICE FOR ELECTRIC VEHICLES

The present invention relates to a charging device and, particularly, a vehicle-bound charging device for charging traction batteries of an electric vehicle from the a.c. current mains, consisting of a d.c. blocking oscillator type converter comprising a controlled power transistor, a cutoff relief circuit, and a power output transformer wherein the secondary winding is connected in series with a rectifier diode, and a smoothing capacitor is connected in parallel with this series circuit.

Customarily, in case of charging devices with relatively high powers to be transferred or converted, current flow converters are utilized directly at the 50 Hz a.c. voltage mains with a relatively high ratio of size and weight and power. A special application is the vehicle-bound charging device of an electric vehicle for charging traction batteries from the a.c. current mains.

The aim underlying the present invention resides in providing a charging device, especially a vehicle-bound charging device for electric vehicles, which minimizes the weight, size and power loss. The above-noted requirements with respect to weight, size and power loss can only be met if the power transfer and voltage adaptation from the 220 volt a.c. current mains to the battery voltage are carried out via a d.c. converter, rather than by means of a 50 Hz transducer-type transformer. The rectified mains voltage is applied as the input voltage to the d.c. converter, and the latter converts this voltage with the aid of controllable current rectifier valves (transistors or thyristors) into a higher-frequency a.c. voltage, wherein this frequency is in most cases placed above the audible limit of 20 kHz. By means of this higher-frequency a.c. voltage, the same power can be transferred with a substantially smaller and lighter transformer. The a.c. voltage transferred to the secondary side is rectified, smoothed, and connected to the load.

In order to withdraw the maximum effective power from the mains, the input current should be maximally sinusoidal and should be in phase with the input voltage.

In accordance with advantageous features of the present invention a converter module is provided which includes two d.c. voltage blocking converters, the power transistors of which are activated by a control circuit in the push-pull mode with a phase shift of 180°, and by connecting the parallel-connected secondary sides of the two blocking converters in such a way that the one secondary winding, on the one hand, is connected to the negative output terminal and, on the other hand, via the one rectifier diode with the positive output terminal; that the other secondary winding is connected, on the one hand, to the positive output terminal and, on the other hand, via the other rectifier diode with the negative output terminal; that, as the relief circuit on the secondary side, a first diode is connected from the junction point of the one secondary winding with the one rectifier diode to a point B, from the latter a second diode is connected in series with a choke to a point C, and from the latter a third diode is connected to the junction point of the other secondary winding with the other rectifier diode, wherein all diodes on the secondary side are poled in such a way that they are current-conductive away from one secondary winding and/or toward the other secondary winding, and wherein respectively one capacitor is connected between point B and the positive output terminal and between point C and the negative output terminal; and that a smoothing capacitor common to all arrangements is provided between the output terminals.

By virtue of the above-noted feature of the present invention, the cutoff relief is then substantially shifted from the primary side to the secondary side of the blocking converter transformer, and immediately at the beginning of the cutoff process and voltage rise, a current flow is introduced into the secondary side which can very quickly take over the current flow on the primary side of $$\hat{\Theta}_1 = i_1 \cdot w_1$$

(after current takeover by the secondary side), and $i_1 = 0$ the ideal relationship applies:

$$\hat{\Theta}_2 = \hat{\Theta}_1 = (i_2 w_2).$$

Advantageously, in accordance with further features of the present invention, an additional capacitor is connected between the port B and the negative output terminal as well as between the point C and the positive output terminal.

The second diode may, in accordance with the present invention be replaced by a thyristor controlled by the control circuit.

In accordance with the present invention, at least one power transformer includes at least one further secondary winding without a secondary side relief circuit connected thereafter.

Several (n) converter modules may be provided according to the present invention, which are operated at the same input and output voltages, with the modules being periodically activated by a control circuit common to all, with a phase angle shifted with respect to one another by 360°/2n.

Advantageously, a rectified unsmoothed alternating voltage is applied to the input terminals of each converter module.

Accordingly, it is an object of the present invention to provide an improved charging device which avoids by simple means shortcomings and disadvantages encountered in the prior art.

It is a further object of the invention to provide an improved charging device wherein nonavailability for transfer to a transformer secondary of energy flowing in the capacitor of an RCD cutoff relief circuit is reduced.

It is a further object of the invention to provide an improved charging device wherein the time, dead time, from the instant of cutoff of a power transistor to the instant when the secondary winding of an output transformer takes over the current flow remaining in the magnetic circuit, is avoided.

Yet another object of the present invention resides in providing a charging device in which overvoltage at the power transistor is avoided.

It is still another object of the invention to provide a charging device with greater useful energy transfer.

Another object of the present invention resides in providing a charging device with greater useful energy transfer.

It is yet another object of the invention to provide a charging device with lower effective currents.

A still further object of the present invention resides in providing a charging device which has a small volume, low weight and high degree of efficiency.

It is a further object of the invention to effect improved operation of a charging device according to this invention by provision of a resistor connection in parallel with each of said first and third diodes.

These and other features and advantages of the present invention will become more apparent from the following description when taken in connection with the accompanying drawing which shows, for the purpose of illustration only, one embodiment in accordance with the present invention, and wherein:

FIG. 1 shows a conventional d.c. blocking converter, and

FIG. 2 shows the circuit of the converter module according to this invention.

FIG. 3 shows a modification of the circuit of FIG. 2.

Figure 4:
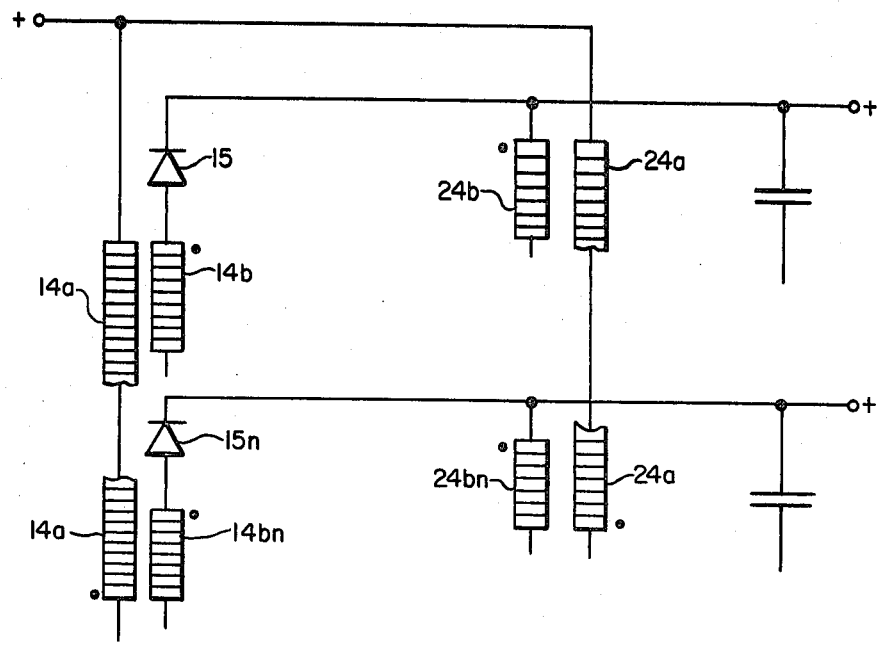
FIG. 4 shows a modification of FIG. 2 employing multiple secondary circuits.

Referring now to the drawings wherein like reference numerals are used in both views to designate like parts and more particularly to FIG. 1, according to this figure, a blocking converter, of conventional construction, with a minimum of structural elements, includes a power transformer 14, switching transistor 12 with cutoff relief unit 13, rectifier diode 15, and smoothing capacitor at the output. An advantage of this type of conventional blocking converter resides in the fact that it can be utilized as a step-up as well as step-down transformer, i.e. its maximum output voltage is not restricted by the ratio of the number of turns, as in a flow converter.

With reference to FIG. 1, the functions and problems encountered in the blocking converter are to be demonstrated. After activation of the power transistor 12, the current through the primary winding 14a rises linearly, i.e. in a ramp-like fashion. While the activation of the transistor is entirely without problems since the inductivity-carrying blocking converter transformer is connected in the primary circuit, the problems arise mainly in case of high input and output voltages, in the turning off of the power transistors. After cutting out the power transistor, the current through the primary winding 14a cannot change in a jump-like fashion, which means that, without an RCD (resistor-capacitor-diode) cutoff relief circuit 13 and with a rapid cutoff, the voltage at the transistor becomes almost arbitrarily high, and the transistor can be destroyed. Since, with a reduction in the time required for cutting off the transistor, the power loss is likewise reduced, i.e. the total degree of efficiency is increased, efforts are being made to provide maximally short switching periods.

For the aforementioned reasons, a cutoff relief circuit, such as the RCD circuit 13, is therefore necessary, which circuit absorbs during the cutoff step, the major portion of the primary current and thus limits the cutoff voltage peaks. Several disadvantages connected with this protective circuit are the following.

A disadvantage resides in the fact that the energy flowing into the capacitor 13a is no longer available for transfer to the secondary side and thus for serving as useful energy. In this connection, the following applies: the greater the cutoff relief chosen, the larger must be the dimension of the capacitance 13a, but the larger is also the amount of magnetic energy which can no longer be transferred.

A further disadvantage of the above-noted protective circuit resides in the fact that the dead time rises with increasing size of the capacitor, i.e. the duration of time from the instant of cutoff of the power transistor 12 to the instant when the secondary winding 14b fully takes over the current flow remaining in the magnetic circuit. Current transfer to the secondary winding 14b begins only after the following applies for the collector-emitter voltage $U_{CE}$ of the power transistor 12:

$$U_{CE} > U_E + (w_1/w_2) U_A$$

wherein
$U_E$ = input voltage
$U_A$ = output voltage
$w_1$ = number of turns of primary winding (14a)
$w_2$ = number of turns of secondary winding (14b)

Accordingly, the current rise velocity on the secondary side depends on the stray and parasitic inductances of the primary and secondary sides, and on the voltage rise velocity at the primary winding which, in turn, is in an inverse proportion to the size of the capacitor 13a.

A substantial disadvantage of the RCD cutoff relief unit 13 resides in that the energy stored in the capacitance 13a must be converted into heat loss via the ohmic resistor 13c.

A circuit not exhibiting this disadvantage is illustrated, for example, in TRW Power Semiconductor Applications leaflet No. 120 (175), page 10, FIG. 25. This circuit represents a cutoff relief circuit which is loss-free in principle and additionally displays the advantage that the current rises during activation of the transistor starting with zero and does not immediately surge to the value $$i_c = U_{(13a)}/R_{(13c)}.$$

The two first-mentioned disadvantages of the cutoff relief on the primary side, however, also apply to these relief circuits which are, in principle, free of power loss, since here, too, the dead time is increased with an increasing capacitor size, and the useful energy in the power transformer 14 is reduced. Accordingly other disadvantages result as well, namely that the power transformer 14 must be dimensioned to be larger, and that more power losses are incurred due to the higher effective current in the primary circuit.

The converter module according to the invention, illustrated in FIG. 2, is composed in principle of two such conventional blocking converters 1, 2 connected in parallel on the primary and secondary sides and being periodically controlled alternatingly with a phase shift of 180° by a control device A common to both of the converters 1, 2 employ a smoothing capacitor on the secondary side common to both of them.

Moreover, one secondary winding 14b is connected, on the one hand, to the negative output terminal $-U_A$ and, on the other hand, via the one rectifier diode 15 to the positive output terminal $+U_A$. The other secondary winding 24b is connected, on the one hand, to the positive output terminal $+U_A$ and, on the other hand, via the other rectifier diode 25 to the negative output terminal. From a junction point of the one secondary winding 14b with the one rectifier diode 15, a first diode 30 is connected to a point B; from the latter, a second diode 35 in series with a choke 36 is connected to a point C;

and from the latter, a third diode 40 is connected to the junction point of the other secondary winding 24b with the other rectifier diode 25.

A transistor 22 is connected to transformer 24a. All of the diodes are poled in such a way that they are conductive away from one secondary winding 14b and/or toward the other secondary winding 24b. Respectively one capacitor 32, 42 is connected between point B and the positive output terminal $+U_A$ and between point C and the negative output terminal $-U_A$. A slight improvement in cutoff relief on the secondary side can be accomplished by connecting between point B and the negative output terminal, as well as between point C and the positive output terminal respectively one additional capacitor 31, 41.

While energy is introduced for storage via the primary winding 14a when the power transistor 12 is turned on, the capacitors 31 and 32 are recharged via the diode 35 and the inductance 36 to such an extent that the voltage $U_{31}$ at the capacitor 31 is equal to the induced voltage at the secondary winding 14b. In case the capacitor voltage drops below the secondary voltage, a portion of the current flow of transformer 14 is taken over via the secondary winding.

The cutoff process and the operation of the power transistor will now be described.

Upon cutting off of the transistor 12, the voltage rises at the primary winding 14a and thus also at the secondary winding 14b; as soon as the voltage at the secondary winding 14b exceeds the voltage potential of capacitors 31 and 32, a current flow begins from the blocking converter transformer into the capacitors 31 and 32. While current transfer by capacitor 31 proceeds very quickly, the current rise velocity is somewhat delayed via capacitor 32 and the smoothing capacitor 16 due to the larger conductor inductances. If current flow is taken over entirely by the secondary winding, the voltage at the secondary winding 14b rises with the cycle duration $$T = 2\pi \sqrt{L_{14b}(C_{31} + C_{32})}$$

level. Thereafter the rectifier diode 15 very rapidly takes over almost the entire current from the secondary winding.

A sinusoidally increasing current now flows via the diode 35 and the choke 36 into the capacitors 41 and 42. At this stage, the voltage at capacitor 42 rises up to the voltage $U_A$—if there is no longer any storage of energy via the secondary winding 24b. The energy still stored in the choke 36 allows the voltage at the capacitor 42 to rise to the value $U_{42} = U_A + (w_2/w_1) U_E$ after the power transistor 22 has been turned on. If now the power transistor 22 cuts off after the storage step, the commutation process is immediately initiated via the capacitors 41 and 42—in correspondence with the capacitors 31 and 32 in case of blocking converter 1—and the primary current flow is taken over.

The dead time occurring in the arrangement of FIG. 1 is avoided in the blocking converter system of this invention according to FIG. 2, since commutation is initiated as early as during the voltage surge or rise and also is concluded during this time. Also the disadvantages directly connected therewith, such as, for example, overvoltage at the transistor, lower useful energy transfer, and higher effective currents are extensively avoided by means of this invention, so that the cutoff aid on the primary side becomes necessary herein only in case of very rapidly switching transistors. However, even very small capacitors 13a and 23a are sufficient for these transistors. Resistor 13c is connected in parallel with diode 13b, both in series with capacitor 132. Similarly, resistor 23c is connected in parallel wih diode 23b, both in series with capacitor 23a.

The turning on process of the power transistor 12 proceeds as follows.

Upon activation of the transistor 12, the voltage in the secondary winding 14b jumps to the value $$U_{14b} = -U_E \cdot w_2/w_1$$

so that the voltage at capacitors 31 and 32 can be recharged via the diode 35 and the inductance 36 to this value. The swing-over cycle duration and the swing-over energy of the commutation auxiliary circuit is selected so that even with maximum input voltage $U_E$ complete recharging of the capacitors is ensured.

It is advantageous, especially in use of variable operating frequencies to replace the second diode 35a by thyristor 35a controlled by the control circuit A as shown in FIG. 3. As shown in FIG. 3, an output from control circuit A is input to diode 35a on the opposite side from junction B.

If differing voltages are to be derived from the charging device, additional secondary windings with rectifier diode and smoothing capacitor can be provided schematically in FIG. 4, but these do not require a relief circuit. As shown in FIG. 4, additional secondary windings such as 14b, 24b, 14bn and 24bn together with attendant respective smoothing capacitors may be provided.

To increase the output power, several (n) converter modules can be connected in parallel on the primary and/or secondary side. In this connection, it is advantageous to control these modules periodically or cyclically by an actuation circuit A common to all, with a phase angle shifted with respect to one another by 360°/2n. As a result, the current ripple and thus the expenditure in filter elements can be greatly reduced.

It would also be possible to monitor the collector-emitter voltage of the power transistors in the turned-on condition and, when a limit value $U_{ce\ lim}$ has been exceeded, to cut off the power transistors.

Figure 5:
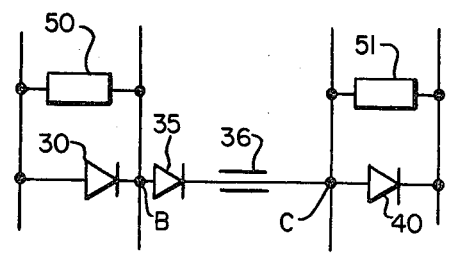
FIG. 5 shows a modification employing a resistor in parallel with each of the first and second diodes.

Another slight improvement can be achieved by parallel connection of respectively one resistor 50, 51, with the first and third diodes 30, 40, as shown schematically in FIG. 5. As they are depicted, resistor 50 is in parallel with diode 30 while resistor 51 is in parallel with diode 40.

The charging device can be supplied with rectified, unsmoothed alternating voltage. A predominantly sinusoidal current is withdrawn from the mains by this charging device.

A special advantage of the invention resides in that it is possible with the aid of this invention to broaden heretofore customary power ranges by ten to fifty times—contrary to previous recommendations to assume that the power limit for blocking converters at voltages of above 100 volts is about 300 watts because above such value dimensioning was considered to be difficult, and other converter types were preferred.

The invention refers to charging devices only by way of example, but is nowise limited thereto.

The invention can be utilized in all those cases where conventional d.c. converters are also being used.

While I have shown and described only one embodiment in accordance with the present invention, it is understood that the same is not limited thereto but is susceptible to numerous changes and modifications as known to one having ordinary skill in the art, and I therefore do not wish to be limited to the details shown and described herein, but intend to cover all such modifications as are encompassed by the scope of the appended claims.

I claim:

1. A charging device, particularly a vehicle-bound charging device for charging the traction batteries of an electric vehicle from the a.c. current mains comprising:
   a converter module;
   comprising at least two d.c. blocking converters, each converter including a controlled power transistor, a cutoff relief circuit, and a power transformer, wherein the secondary winding is connected in series with a rectifier diode, and a smoothing capacitor is connected in parallel to this series circuit,
   the power transistors of each converter are activated by a control circuit in the push-pull mode with a phase shift of 180°, and
   the parallel-connected secondary sides of the two blocking converters are connected in such a way that the one secondary winding, on the one hand, is connected to the negative output terminal and, on the other hand, via the one rectifier diode to the positive output terminal;
   the other secondary winding is connected, on the one hand, to the positive output terminal and, on the other hand, via the other rectifier diode to the negative output terminal;
   a first diode is connected as the relief circuit on the secondary side from the junction point of the one secondary winding with the one rectifier diode to a first point, from the latter a second diode is connected in series with a choke to a second point, and from the latter a third diode is connected to the junction point of the other secondary winding with the other rectifier diode,
   wherein all diodes on the secondary side are poled in such a way that they are current-conductive away from one secondary winding and/or toward the other secondary winding, and
   wherein respectively one capacitor is connected between said first point and the positive output terminal and between said second point and the negative output terminal; and that a smoothing capacitor common to all is provided between the output terminals.

2. Charging device according to claim 1, characterized in that respectively one additional capacitor is connected between said first point and the negative output terminal, as well as between said second point and the positive output terminal.

3. Charging device according to claim 2, characterized in that at least one power transformer exhibits at least one further secondary winding without a secondary-side relief circuit connected thereto.

4. Charging device according to claim 1, characterized in that at least one power transformer exhibits at least one further secondary winding without a secondary-side relief circuit connected thereto.

5. Charging device according to claim 1, for differing voltages to be derived, further comprising
   additional secondary windings with rectifier diode and smoothing capacitor.

6. Charging device according to claim 1, further comprising
   a resistor in parallel with each of said first and third diodes.

7. A charging device, particularly a vehicle-bound charging device for charging the traction batteries of an electric vehicle from the a.c. current mains comprising:
   a converter module;
   comprising at least two d.c. blocking converters, each converter including a controlled power transistor, a cutoff relief circuit, and a power transformer, wherein the secondary winding is connected in series with a rectifier diode, and a smoothing capacitor is connected in parallel to this series circuit,
   the power transistors of each converter are activated by a control circuit in the push-pull mode with a phase shift of 180°, and
   the parallel-connected secondary sides of the two blocking converters are connected is such a way that the one secondary winding, on the one hand, is connected to the negative output terminal and, on the other hand, via the one rectifier diode to the positive output terminal;
   the other secondary winding is connected, on the one hand, to the positive output terminal and, on the other hand, via the other rectifier diode to the negative output terminal;
   a first diode is connected as the relief circuit on the secondary side from the junction point of the one secondary winding with the one rectifier diode to a first point, from the latter a thyristor controlled by said control circuit is connected in series with a choke to a second point, and from the latter a second diode is connected to the junction point of the other secondary winding with the other rectifier diode,
   wherein all diodes on the secondary side are poled in such a way that they are current-conductive away from one secondary winding and/or toward the other secondary winding, and
   wherein respectively one capacitor is connected between said first point and the positive output terminal and between said second point and the negative output terminal; and that a smoothing capacitor common to all is provided between the output terminals.

8. Charging device according to claim 7, characterized in that at least one power transformer exhibits at least one further secondary winding without a secondary-side relief circuit connected thereto.

9. A charging device, particularly a vehicle-bound charging device for charging the traction batteries of an electric vehicle from the a.c. current mains comprising:
   a converter module;
   comprising at least two d.c. blocking converters, each converter including a controlled power transistor, a cutoff relief circuit, and a power transformer, wherein the secondary winding is connected in series with a rectifier diode, and a smoothing capacitor is connected in parallel to this series circuit, the power transistors of each converter are activated by a control circuit in the push-pull mode with a phase shift of 180°, and the parallel-connected secondary sides of the two blocking converters are connected in such a way that the one secondary winding, on the one hand, is connected to the negative output terminal and, on the other hand, via the one rectifier diode to the positive output terminal;

the other secondary winding is connected, on the one hand, to the positive output terminal and, on the other hand, via the other rectifier diode to the negative output terminal;

a first diode is connected as the relief circuit on the secondary side from the junction point of the one secondary winding with the one rectifier diode to a first point, from the latter a thyristor controlled by said control circuit is connected in series with a choke to a second point, and from the latter a second diode is connected to the junction point of the other secondary winding with the other rectifier diode, wherein all diodes on the secondary side are poled in such a way that they are current-conductive away from one secondary winding and/or toward the other secondary winding, and wherein respectively one capacitor is connected between said first point and the positive output terminal and between said second point and the negative output terminal; and that a smoothing capacitor common to all is provided between the output terminals, and respectively, one additional capacitor is connected between said first point and the negative output terminal, as well as between said second point and the positive output terminal.

10. Charging device according to claim 9, characterized in that at least one power transformer exhibits at least one further secondary winding without a secondary-side relief circuit connected thereto.

11. Charging device according to one of claims 1, 2, 4, 10, 7 and 9, characterized in that a rectified, unsmoothed alternating voltage is applied to the input terminals of each converter module.

12. Charging device, particularly a vehicle-bound charging device for charging the traction batteries of an electric vehicle from the a.c. current mains of variable operating frequencies comprising a converter module, comprising at least two d.c. blocking converters, each converter including a controlled power transistor, a cutoff relief circuit, and a power transformer, wherein the secondary winding is connected in series with a rectifier diode, and a smoothing capacitor is connected in parallel to this series circuit, the power transistors of each converter are activated by a control circuit in the push-pull mode with a phase shift of 180°;

the parallel-connected secondary sides of the two blocking converters are connected in such a way that the one secondary winding, on the one hand, is connected to the negative output terminal and, on the other hand, via the one rectifier diode to the positive output terminal;

the other secondary winding is connected, on the one hand, to the positive output terminal and, on the other hand, via the other rectifier diode to the negative output terminal;

a first diode is connected as the relief circuit on the secondary side from the junction point of the one secondary winding with the one rectifier diode to a first point, from the latter a thyristor controlled by said control circuit is connected in series with a choke to a second point, and from the latter a third diode is connected to the junction point of the other secondary winding with the other rectifier diode;

wherein all diodes on the secondary side are poled in such a way that they are current-conductive away from one secondary winding and/or toward the other secondary winding, and wherein respectively one capacitor is connected between said first point and the positive output terminal and between said second point and the negative output terminal; and that a smoothing capacitor common to all is provided between the output terminals.

* * * * *